United States Patent
Grimmel et al.

(10) Patent No.: US 9,623,458 B2
(45) Date of Patent: Apr. 18, 2017

(54) INSTALLATION PIECE FOR SUPPORTING A ROLLER IN A ROLLER STAND

(71) Applicant: SMS group GMBH, Düsseldorf (DE)

(72) Inventors: Rüdiger Grimmel, Netphen (DE); Karl Keller, Hilchenbach (DE); Konrad Roeingh, Hilchenbach (DE); Johannes Alken, Siegen (DE); Kurt Scheffe, Hilchenbach (DE)

(73) Assignee: SMS GROUP GMBH, Düsseldorf (DE)

( * ) Notice: Subject to any disclaimer, the term of this patent is extended or adjusted under 35 U.S.C. 154(b) by 0 days.

(21) Appl. No.: 14/758,365

(22) PCT Filed: Dec. 18, 2013

(86) PCT No.: PCT/EP2013/077091
§ 371 (c)(1),
(2) Date: Jun. 29, 2015

(87) PCT Pub. No.: WO2014/102109
PCT Pub. Date: Jul. 3, 2014

(65) Prior Publication Data
US 2015/0352611 A1    Dec. 10, 2015

(30) Foreign Application Priority Data
Dec. 28, 2012    (DE) .......................... 10 2012 224 511

(51) Int. Cl.
*B21B 31/07*    (2006.01)
*F16N 7/40*    (2006.01)
(Continued)

(52) U.S. Cl.
CPC ............ *B21B 31/076* (2013.01); *B21B 31/07* (2013.01); *F16C 13/02* (2013.01);
(Continued)

(58) Field of Classification Search
CPC ....... B21B 31/076; B21B 31/07; F16C 13/02; F16C 33/1065; F16N 7/40; F16N 2013/205
(Continued)

(56) References Cited

U.S. PATENT DOCUMENTS 1,434,138 A    10/1922    Moerscher
4,422,318 A  *  12/1983    Christ .................... B21B 27/10
                                                              72/200
(Continued)

FOREIGN PATENT DOCUMENTS

CH           95561 A      7/1922
EP        1078712 B2     12/2004
(Continued)

OTHER PUBLICATIONS

Jun. 28, 2015 (IPEA/409) English Translation of International Preliminary Report on Patentability Chapter II.

*Primary Examiner* — Michael Riegelman
(74) *Attorney, Agent, or Firm* — Lucas & Mercanti, LLP; Klaus P. Stoffel

(57) ABSTRACT

An installation piece for supporting a roller in a roller stand of a roller frame. The installation piece includes a main bore for receiving a journal of the roller, an inlet for a lubricant, an outlet for the lubricant, and a pump device for pumping the lubricant leaving the installation piece through the outlet. The pump device has a housing, an inlet channel, and an outlet channel. The inlet channel communicates with the inlet and the outlet channel communicates with the outlet for the flow of the lubricant. The pump device is driven by the flow of the lubricant in the inlet. The housing of the pump device is equipped with a screw pump and a turbine, which is driven by the pressurized inflowing lubricant, in the inlet channel for driving the screw pump.

8 Claims, 4 Drawing Sheets

(51) Int. Cl.
*F16C 13/02* (2006.01)
*F16C 33/10* (2006.01)
*F16N 13/20* (2006.01)

(52) U.S. Cl.
CPC ............ *F16C 33/1065* (2013.01); *F16N 7/40* (2013.01); *F16N 2013/205* (2013.01)

(58) Field of Classification Search
USPC ........................................................ 184/27.1
See application file for complete search history.

(56) References Cited

U.S. PATENT DOCUMENTS

| | | | | |
|---|---|---|---|---|
| 4,428,678 | A * | 1/1984 | Lyle | ................ E04G 21/08 366/122 |
| 4,944,609 | A * | 7/1990 | Salter, Jr. | ............. B21B 31/074 384/118 |
| 8,282,352 | B2 * | 10/2012 | Anderson, Jr. | ........ F03B 17/061 415/4.3 |
| 8,371,148 | B2 | 2/2013 | Keller et al. | |
| 2007/0003174 | A1 * | 1/2007 | Keller | ................... B21B 31/074 384/286 |
| 2010/0125992 | A1 * | 5/2010 | Keller | ................... B21B 31/074 29/252 |
| 2011/0232351 | A1 * | 9/2011 | Keller | ................... B21B 31/074 72/237 |
| 2015/0114066 | A1 * | 4/2015 | Keller | ................... B21B 31/074 72/236 |
| 2015/0231676 | A1 * | 8/2015 | Alken | ..................... B23B 27/10 72/201 |

FOREIGN PATENT DOCUMENTS

| | | |
|---|---|---|
| EP | 1497048 B1 | 10/2006 |
| JP | S57195918 A | 12/1982 |
| JP | 2009523069 A | 6/2009 |
| WO | 03090948 A2 | 11/2003 |

* cited by examiner

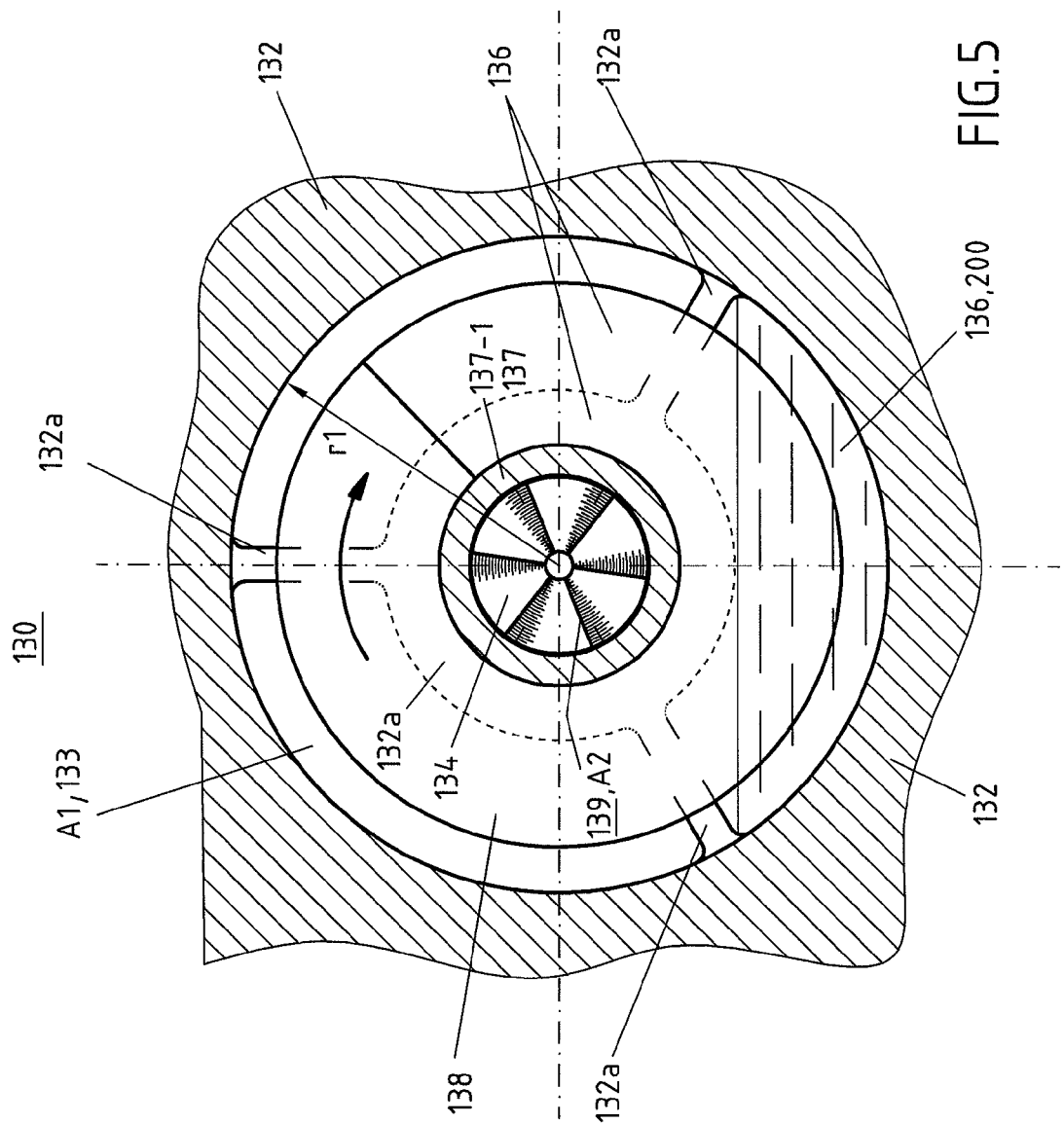

INSTALLATION PIECE FOR SUPPORTING A ROLLER IN A ROLLER STAND

The present application is a 371 of International application PCT/EP2013/077091, filed Dec. 18, 2013, which claims priority of DE 10 2012 224 511.1, filed Dec. 28, 2012, the priority of these applications is hereby claimed and these applications are incorporated herein by reference.

BACKGROUND OF THE INVENTION

The invention pertains to an installation piece, i.e., a bearing housing for supporting a roll in a roll housing of a rolling stand. The rolling stand comprises a main bore to hold the journal of the roll. The installation piece comprises an inlet for supplying lubricant, typically under pressure, to the interior of the installation piece and an outlet for carrying the lubricant back out of the installation piece. The lubricant serves to lubricate the roll neck bearing during the rolling of stock such as slabs.

The installation piece can be provided with a pump device for conveying the lubricant flowing back from the installation piece through the return. Such a pump device will then comprise a housing, an inlet channel, and an outlet channel, wherein the inlet channel in the pump device communicates fluidically with the inlet in the installation piece, and the outlet channel in the pump device communicates fluidically with the outlet for the lubricant in the installation piece. The pump device can be driven by the flow of lubricant in the inlet. The basics of installation pieces of this type with pump devices for supporting the return flow of the lubricant are known in the prior art according to, for example, European patents EP 1 078 172 B1 and EP 1 497 048 B1 or according to the international patent application WO 03/090948 A2.

A wide variety of pump devices are also generally known from the prior art, such as circulation pumps, hydraulic power screws, and screw pumps as described in Wikipedia, for example. Screw tube conveyors, for example, are also known from U.S. Pat. No. 1,434,138 or from CH 95561.

SUMMARY OF THE INVENTION

The invention is based on the goal of providing an installation piece with an alternative pump device for supporting the return flow of lubricant from the installation piece.

This is characterized in that the pump device comprises, in its housing, a screw pump with a feed screw in the outlet channel for conveying the returning lubricant and, to drive the screw pump, a turbine in the inlet channel, which is driven by the lubricant arriving under pressure.

The inlet and the outlet—the outlet also being called the "return" in the following—are arranged in the installation piece. The inlet channel and the outlet channel—also called the "return channel" in the following—are arranged outside the installation piece in the pump device. The inlet is at least roughly aligned with the inlet channel at their connecting point. The outlet channel is at least roughly aligned with the outlet channel at their connecting point.

According to a first exemplary embodiment, the screw pump is formed by a tubular base body, which carries a feed screw on its outside surface; and the housing of the pump device comprises a bore, in which the screw pump is rotatably supported in bearings. The space between the outside surface of the base body and the inside surface of the bore forms the outlet channel, wherein the feed screw projects into the return channel to convey the returning lubricant, and wherein the bearings—and thus also the feed screw—are supported by retaining means in the interior of the bore in such a way that they remain in the same position but are free to rotate.

Each of the individual turns of the feed screw is advantageously arranged at an acute angle $\alpha$—in the flow direction of the lubricant in the return—to the tubular base body. This angle advantageously increases the efficiency of the feed screw.

The retaining means for the bearings are, for example, configured as spoked wheels or perforated plates, each of which extends in a plane perpendicular to the longitudinal axis of the bore in the housing. At their periphery, they are connected to the housing at the inside surface of the bore. At their inside ends, each one carries—preferably coaxial to the bore—one of the bearings for the screw pump.

The configuration of the retaining means in the form of spoked wheels or perforated plates is quite necessary to keep the return channel open, at least below the longitudinal axis of the bore, for the flow of the lubricant.

The interior of the tubular base body forms the inlet channel. In this inlet channel, the turbine which drives the screw pump is arranged. This structural configuration according to the invention, in which the inlet channel is arranged in the center along the longitudinal axis and the return channel is arranged coaxially to the inlet channel, offers the advantage that the pump device can be built very compactly, that is, in a space-saving manner.

It is advantageous for the ratio of the cross-sectional area of the return channel to the cross-sectional area of the inlet channel to be in the range of 2-10. That the return channel must have a larger cross section than the inlet channel results simply from the fact that the lubricant is pumped under pressure into the inlet channel, whereas—at the same volume flow rate—it flows through the return channel merely at atmospheric pressure.

On the outlet side of the installation piece, the return emerges from the installation piece in the form of a single bore, and the single inlet is guided into the installation piece inside the bore for the return. The pump device is preferably a separate unit, which is set externally onto the outlet side of the installation piece in such a way that the inlet channel of the pump device communicates fluidically with the inlet of the installation piece, and the return channel of the pump device communicates fluidically with the return of the installation piece.

The outlet side of the installation piece is the side which is opposite the barrel side of the installation piece. The barrel side of the installation piece is the side which directly faces the barrel of the roll after the roll has been installed.

According to another exemplary embodiment, the bore for the return on the outlet side of the installation piece is positioned with respect to the main bore which holds the neck of the roll in such a way that the upper vertex of the bore for the return comprises a vertical distance s of $0<s<r1$ from the lower vertex of the effective opening of the ring-shaped sealing lip arranged in the main bore, where r1 is the radius of the bore for the return. The upper vertex of the bore for the return preferably lies above the lower vertex of the effective radius of the sealing lip. Between the center of the main bore and the center of the bore for the return, there is a horizontal distance d1 of $R1<d1<R1+100$ mm, where R1 is the effective radius of the ring-shaped sealing lip; it is somewhat smaller than the radius of the main bore.

The ring-shaped sealing lip is set onto the neck of the roll and seals the roll against the main bore of the installation piece. The effective opening of the sealing lip is to be understood as the opening which results when the sealing lip is under slight radial compression after the roll neck has been put in place. The radius of this effective opening is called the effective radius of the sealing lip.

The diameter of the bore for the return in the installation piece and of the bore for the return channel in the pump device is advantageously in the range of only 40-80 mm.

The installation piece can be an upper installation piece for supporting an upper back-up roll or a lower installation piece for supporting a lower back-up roll in the rolling stand.

Finally, it is advantageous for the bottom surface of the upper installation piece to be flat. The distance d2 between the lower vertex UB of the main bore (110) and of the installation piece and the flat bottom surface of the upper installation piece is d2<20 mm, preferably d2<10 mm.

In general, the present invention offers the following advantages:

The pump device increases the volume flow rate of the lubricant in the outlet. This offers the advantages that, when installation pieces according to the invention are used, it is possible to select a smaller cross-sectional area or a smaller radius for the bore of the outlet in comparison to installation pieces without the pump device according to the invention. In particular, when the pump device according to the invention is used, it is possible to eliminate completely a second bore for the return of the lubricant as is typically used in traditional installation pieces; that is, when the pump device according to the invention is used, it is necessary to provide only a single bore for the outlet on the outlet side of the installation piece.

It is also possible, furthermore, especially when the claimed horizontal distance d1 and the vertical distance s are respected, to adhere to a previously determined maximum distance between the lower vertex (UB) of the main bore (110) and the preferably flat bottom surface of the installation piece or to an even shorter distance. This in turn offers the advantage that the overall height of the installation piece can be kept comparatively low in comparison to traditional installation pieces, resulting in the advantage that more room is available in the window of the roll housing for the installation of other components such as bending cylinders.

A total of five figures is attached to the invention:

BRIEF DESCRIPTION OF THE DRAWING

FIG. 5 shows a cross section through the pump device according to the invention.

DETAILED DESCRIPTION OF THE INVENTION

The invention in the form of exemplary embodiments is described in detail below on the basis of the attached figures. Technical elements which are the same are designated by the same reference numbers in all the figures.

Figure 1:
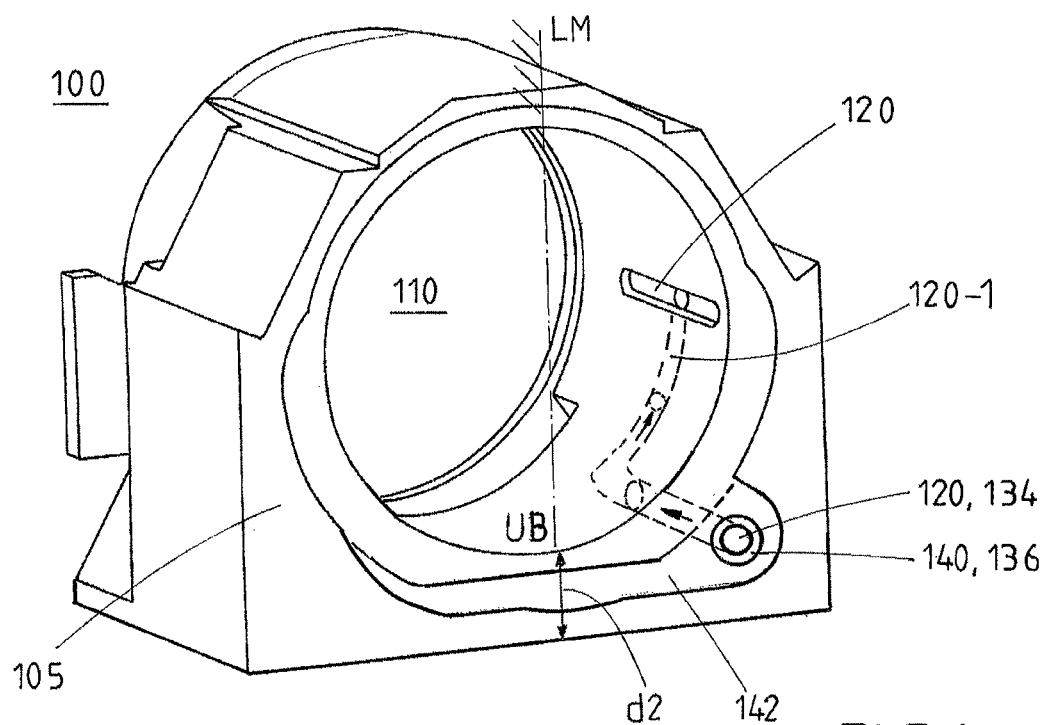
FIG. 1 shows a perspective view of the installation piece according to the invention.

FIG. 1 shows by way of example a perspective view of the installation piece 100 according to the invention, the view being directed toward its outlet side 105.

An installation piece constitutes a bearing housing to hold the neck of a roll (not shown here). The installation piece is typically vertically movable in the window of a roll housing. In the installation piece, a main bore 110 is provided to hold the roll neck and preferably also a bearing bush and a neck bush, which, however, will not be discussed further here. When the roll or roll neck is supported in the bore of the installation piece, one side of the installation piece will be facing the barrel of the roll. This side of the installation piece is called the barrel side. The previously mentioned outlet side 105 of the installation piece is opposite the barrel side. The name comes from the fact that the lubricant, which is supplied on this side to the installation piece during operation, i.e., during the rotation of the roll, emerges from the barrel side and is carried away from there.

In FIG. 1, an inlet 120 can be seen, through which the lubricant 200 is introduced into the installation piece 100, so that, via the inlet opening 120-1, it can enter the intermediate space between the bore of the installation piece and the roll neck or, more precisely, into the intermediate space between a bearing bush and a neck bush, so that it can form a lubricating film there. During the operation of the roll, the lubricant is guided continuously around a circuit; that is, lubricant is supplied continuously under pressure via the inlet 120 and carried away from the outlet side. After it has been used in the intermediate space, the lubricant collects in the lower area of the installation piece on the barrel side and on the outlet side in a lubricant collection space 142 of the installation piece. From there, it is typically pumped away and returned to the lubricant circuit. The pump, which serves to maintain the lubricant circulation and which pumps the lubricant at a pressure p into the inlet 120, is not an object of the invention and for this reason is not shown in the figures. The important point, however, is that this pump is not to be confused with the pump device 130, which is the object of the invention.

In FIG. 1, the outer coaxial ring represents both the outlet 140 inside the installation piece and the outlet channel 136, typically aligned with it, in the pump device according to the invention for carrying away the lubricant which has collected in the lubricant collection space 142.

The vertical center plane LM of the main bore 110 is also indicated in FIG. 1. As already explained above at the end of the general part of the description, the pump device according to the invention to be described below makes it possible for the distance d2 between the lower vertex UB of the main bore 110 and the preferably flat-configured bottom surface of the upper installation piece to be made comparatively short: The upper limit is at d2<20 mm, and preferably d2<10 mm. The lower limit, in contrast, is determined by safety considerations and/or by the necessary bearing load.

Figure 2:
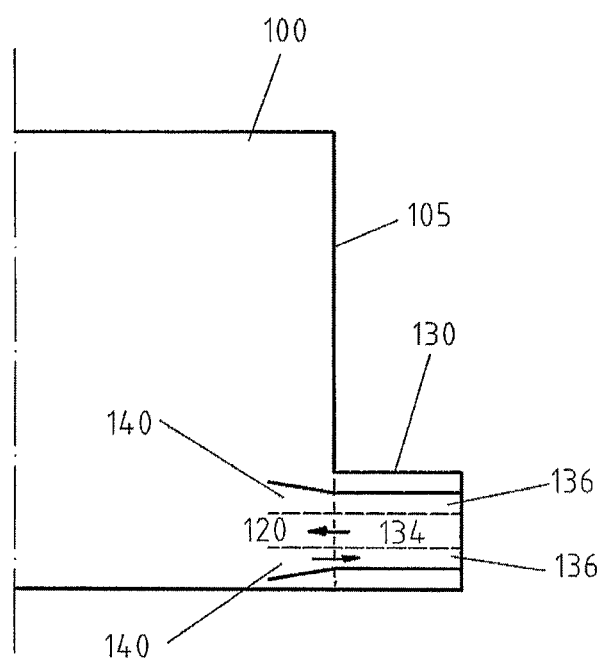
FIG. 2 shows a longitudinal cross section through the installation piece with the pump device set in place.

FIG. 2 shows a longitudinal cross section through the installation piece 100 with its outlet side 105 and the pump device 130. It can be seen that the pump device 130 is set onto the outlet side 105 of the installation piece, and that the inlet 120 for the lubricant 200 in the interior of the installation piece 100 communicates fluidically with the inlet channel 134 in the interior of the pump device 130. Similarly, the outlet 140 in the interior of the installation piece communicates fluidically with the outlet channel 136 inside the pump device. According to the invention, the inlet channel 134 and the outlet channel 136 are coaxial to each other.

Figure 3:
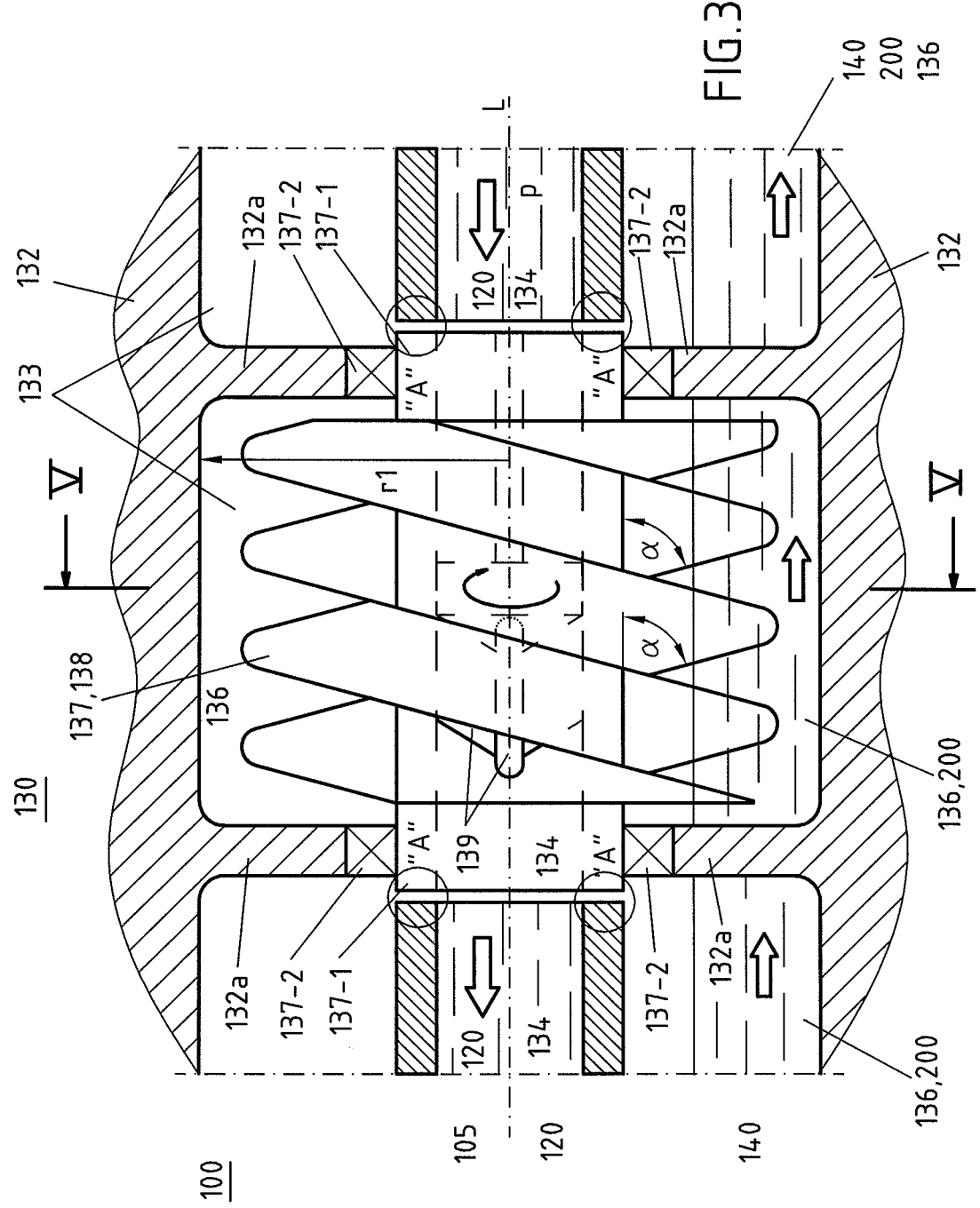
FIG. 3 shows a longitudinal cross section through the pump device according to the invention.

FIG. 3 shows a longitudinal cross section through the pump device 130 according to the invention. The pump device has a housing 132, in which a screw pump 137 is rotatably supported. A tubular base body 137-1 of the screw pump 137 is supported rotatably in bearings 137-2. The bearings 137-2 and thus also the screw pump 137 supported therein are mounted in the interior of the housing 132 by means of the retaining means 132a. The retaining means 132a are configured in the form of spoked wheels or perforated plates, for example. Each of the retaining means preferably extends in a plane perpendicular to the longitudinal axis L of the bore in the housing 132. At their periphery, the retaining means are connected, possibly integrally, to the housing 132 at the inside surface of the bore.

The tubular base body 137-1 of the screw pump 137 carries on its outside surface a feed screw 138. The turns of the feed screw 138 project into the intermediate space between the outside surface of the tubular base body 137-1 of the screw pump 137 and the inside surface of the bore in the housing 132, wherein this intermediate space forms the outlet channel 136 for the lubricant 200. The turns of the feed screw are set at an angle $\alpha$, in the flow direction, to the outside surface of the tubular base body 137-1. The flow direction of the lubricant 200 supplied through the inlet channel 134 and leaving the lubricant collection space 142 is indicated by the arrows in FIG. 3.

The outlet channel 136 is coaxial to an inlet channel 134, which is formed by the interior of the tubular base body 137. In the interior of the tubular base body, there is a turbine 139, which is connected nonrotatably by its outside surface to the tubular base body 137-1. The turbine 139 is driven by the pressurized lubricant which the circulation pump (not shown here) supplies via the inlet channel 134; in FIG. 3, the lubricant flows through the inlet channel 134 from right to left. It is advantageous that the turbine therefore does not require its own independent drive device or any external or additional energy input. The turbine drives the screw pump 137 as a result of its permanent connection to the tubular base body 137-1 and in this way causes the feed screw 138 to rotate. Because this feed screw 138, as previously mentioned, projects into the lubricant 200 present in the outlet channel 136, the rotation of the feed screw 138 supports the desired outflow of the lubricant 200 from the lubricant collection space 142. After the incoming lubricant has passed by the turbine in the interior of the inlet channel 134, it enters the lubricant inlet 120 present in the interior of the installation piece, so that it can be fed via the inlet opening 120-1 into the intermediate space between the roll neck and the bore of the installation piece, i.e., between the neck bush and the bearing bush.

At point "A", a sealing device according to the prior art is arranged.

Figure 4:
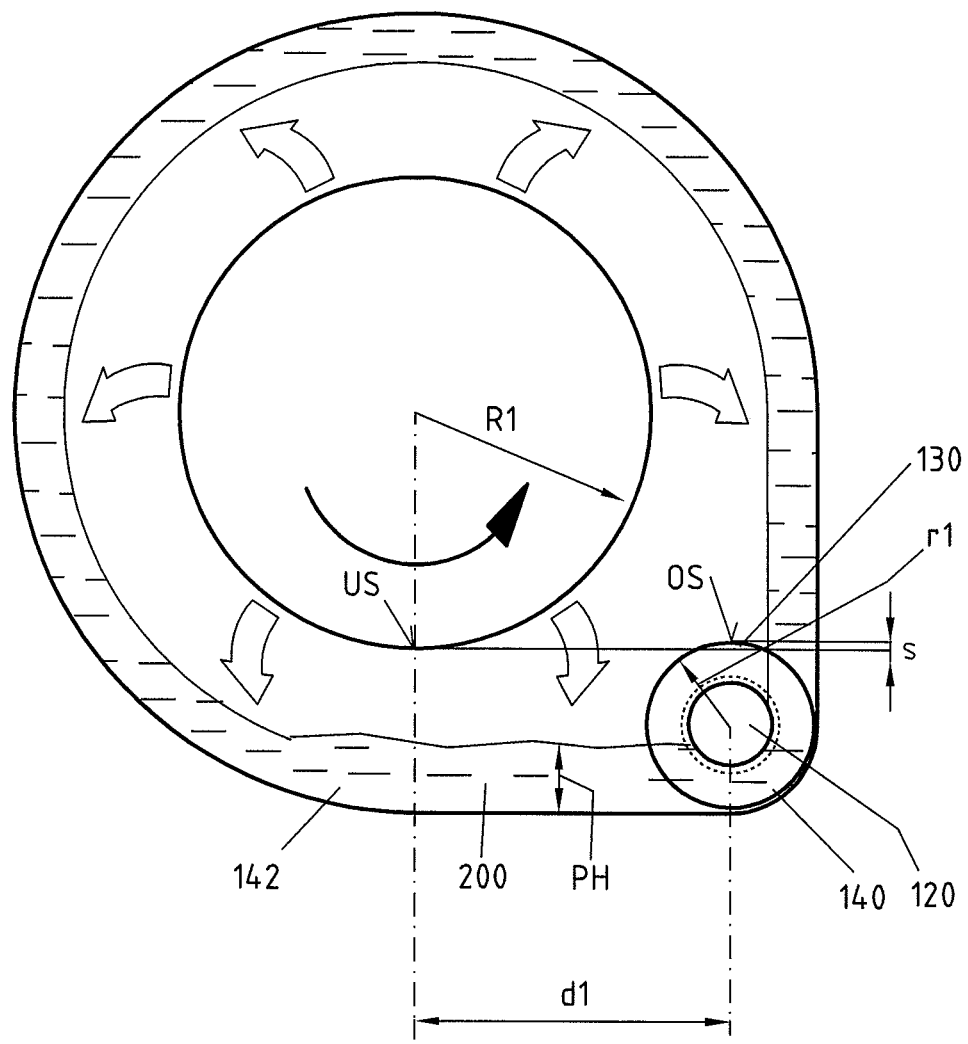
FIG. 4 shows a schematic cross section through the outlet side of the installation piece.

FIG. 4 shows a cross section through the outlet side of the installation piece 100. The cross section is shown only in highly schematic fashion. It serves to illustrate the structural relationships essential to the present invention.

First, it is important to position the center point or longitudinal axis of the pump device 130 according to the invention in relation to the lubricant collection space 142 in such a way that, during operation of the roll, the maximum level PH of the lubricant 200 in the interior of the lubricant collection space 142 does not rise above the center axis or longitudinal axis L of the pump device 130. At the same time, the level of the lubricant 200, e.g., oil, in the return channel should not fall below the lower vertex of the turns of the feed screw during operation. It is also important for the upper vertex OS of the bore for the outlet 140 always to be above, in the vertical direction, the lower vertex US of the effective opening of a ring-shaped sealing lip arranged in the main bore 110. The distance should preferably be greater than 0 and less than the radius r1 of the bore for the outlet 140. In addition, for the horizontal distance d1 between the center of the main bore 110 and the center of the bore for the outlet 140, it should be true that $R1<d1<R1+100$ mm, wherein R1 is the effective radius of the ring-shaped sealing lip.

To explain the term "effective radius": Before the roll neck has been introduced into the bore 100, the sealing lip is not under any load; that is, its inside radius has the minimum value. After the roll neck has been introduced into the bore, however, the sealing lip rests against the roll neck and is thus compressed slightly in the radial direction. This radial compression brings about a slight increase in the inside radius of the sealing lip; the radius of the sealing lip thus obtained is called the "effective radius".

FIG. 5 shows a cross section through the pump device 130 according to the invention. The outer shaded area shows the pump housing 132 with a circular or cylindrical bore, in which the screw pump 137 is mounted. It is possible to see the tubular base body 137-1, which is coaxial to the bore in the housing 132. In the interior of the tubular base body 137-1, the turbine 139 with its impellers is illustrated schematically. The internal cross section of the tubular base body represents the cross-sectional area A2 of the inlet channel 134.

The outside space between the outside surface of the ring-shaped base body 137-1 and the inside surface of the bore 133 in the interior of the housing 132 represents, as already explained above, the outlet channel 136. The cross-sectional area of this coaxial annular space represents the cross-sectional area A1 of the outlet channel. Because the lubricant is supplied under pressure p through the inlet channel 134 and the inlet 120 into the installation piece and is carried away through the outlet channel 136 only at atmospheric pressure, the cross-sectional area of the inlet channel 134 can be considerably smaller than the cross-sectional area of the outlet channel 136. The ratio of cross-sectional area A1 of the outlet channel to the cross-sectional area A2 of the inlet channel is typically in the range of 2-10. This ratio is made possible primarily by the pump device 130 according to the invention, which allows the more rapid removal of the lubricant 200 from the lubricant collection space 142 under atmospheric pressure.

As previously mentioned, the pump device 130 makes it possible to eliminate a second outlet bore on the outlet side of the installation piece. In addition, the radius r1 of the bore 133 in the housing 132 of the pump device or of the outlet channel 136 can be kept so small that the structural distance ratios described above with reference to FIG. 4 can be easily maintained.

Finally, FIG. 5 shows the spoke-like structure of the retaining means 132a. This structure of the retaining means in the form of spoked wheels or perforated plates is necessary so that the lubricant can flow through the pump device and in particular flow through the outlet channel 136.

LIST OF REFERENCE SYMBOLS 100 installation piece
105 outlet side
110 main bore
120 inlet
120-1 inlet opening
130 pump device
132 housing
132a retaining means
133 bore
134 inlet channel 136 outlet channel
137 screw pump
137-1 tubular base body
137-2 bearing
138 feed screw
139 turbine
140 outlet
142 lubricant collection space
200 lubricant
A1 cross-sectional area, outlet channel
A2 cross-sectional area, inlet channel
OS upper vertex of the outlet bore
US lower vertex of the effective diameter of the ring seal
UB lower vertex of the main bore
R1 effective radius of the ring-shaped sealing lip
r1 radius of the bore for the outlet
d1 horizontal distance between the center of the main bore and the center of the bore for the outlet
d2 distance between the lower vertex (UB) of the main bore (110) of the installation piece and the bottom surface of the upper installation piece
L longitudinal axis (L) of the bore (133) in the housing
LM vertical central plane of the main bore
s distance
PH oil level in the lubricant collection space (142)

We claim:

1. An installation piece for supporting a roll in a roll housing of a rolling stand comprising:
   a main bore for holding a roll neck;
   an inlet for lubricant;
   an outlet for the lubricant;
   a pump device for conveying the lubricant flowing back out of the installation piece through the outlet;
   wherein the pump device comprises a housing, an inlet channel, and an outlet channel, wherein, with respect to the flow of the lubricant, the inlet channel communicates with the inlet and the outlet channel communicates with the outlet; and
   wherein the pump device is driven by the flow of the lubricant in the inlet;
   wherein the pump device comprises a housing, arranged in the housing are:
   a screw pump with a feed screw in the outlet channel for conveying the returning lubricant; and
   a turbine in the inlet channel for driving the screw pump, the turbine being driven by the lubricant being supplied under pressure;
   the screw pump has a tubular base body with an outer surface that carries the feed screw;
   the housing comprises a bore, in which the screw pump is rotatably supported in bearings;
   wherein a space between the outer surface of the base body and an inside surface of the bore forms the outlet channel;
   wherein the feed screw projects into the outlet channel to convey the lubricant; and
   wherein the housing has retaining members arranged to axially position the bearings and thus also the screw pump in the interior of the bore so that the bearings and the screw pump are free to rotate;
   wherein the feed screw has turns arranged at an acute angle α, in a flow direction of the lubricant in the return, to the tubular base body;
   the retaining members are configured as spoked wheels or perforated plates, each of which extends in a plane perpendicular to a longitudinal axis of the bore in the housing; each of the retaining members having a periphery connected to the housing at the inside surface of the bore; and each of the retaining members having an inside end, coaxial to the bore, that carries one of the bearings for the screw pump; and
   an interior of the tubular base body forms the inlet channel, in which the turbine, nonrotatably connected to the base body, is arranged.

2. An installation piece according to claim 1, wherein a ratio of a cross-sectional area of the outlet channel to a cross-sectional area of the inlet channel is in the range of 2-10.

3. An installation piece according to claim 1, wherein
   the outlet is on an outlet side of the installation piece and emerges from the installation piece as a single bore, and
   the inlet is guided into the installation piece inside the bore for the outlet; and in that
   the pump device is mounted externally on the outlet side of the installation piece so that the inlet channel in the pump device communicates with the inlet of the installation piece, and the outlet channel in the pump device communicates with the outlet of the installation piece.

4. An installation piece according to claim 3, wherein
   the single bore for the outlet on the outlet side of the installation piece is positioned in relation to the main bore which holds the roll neck so that an upper vertex of the bore for the outlet comprises a vertical distance s of $0<s<r1$ from a lower vertex of an effective opening of a ring-shaped sealing lip arranged in the main bore, where r1 is radius of the single bore for the outlet; wherein the upper vertex of the single bore for the outlet lies above the lower vertex of the effective opening of the sealing lip; and
   between a center of the main bore and a center of the single bore for the outlet, there is a horizontal distance d1 of $R1<d1<R1+100$ mm, wherein R1 is an effective radius of the ring-shaped sealing lip.

5. An installation piece according to claim 4, wherein a bottom surface of the installation piece is flat.

6. An installation piece according to claim 5, wherein, for the distance d2 between the lower vertex of the main bore of the installation piece and the bottom surface of the upper installation piece, $d2<20$ mm.

7. An installation piece according to claim 6, wherein $d2<10$ mm.

8. An installation piece according to claim 1, wherein diameters of the bores for the outlet inside the installation piece and for the outlet channel in the pump device are in the range of 40-80 mm, and the bores are at least roughly aligned at their connecting point.

* * * * *